(12) United States Patent
Kadoya et al.

(10) Patent No.: US 10,350,699 B2
(45) Date of Patent: Jul. 16, 2019

(54) METHOD FOR MANUFACTURING JOINED MEMBER AND JOINED MEMBER MANUFACTURING APPARATUS

(71) Applicant: ORIGIN ELECTRIC COMPANY, LIMITED, Saitama-shi, Saitama (JP)

(72) Inventors: Yasuo Kadoya, Saitama (JP); Yuki Oshino, Saitama (JP); Koji Matsubara, Saitama (JP)

(73) Assignee: ORIGIN ELECTRIC COMPANY, LIMITED, Saitama-Shi, Saitama (JP)

( * ) Notice: Subject to any disclaimer, the term of this patent is extended or adjusted under 35 U.S.C. 154(b) by 0 days.

(21) Appl. No.: 16/080,443

(22) PCT Filed: Aug. 10, 2017

(86) PCT No.: PCT/JP2017/029136
§ 371 (c)(1),
(2) Date: Aug. 28, 2018

(87) PCT Pub. No.: WO2018/043099
PCT Pub. Date: Mar. 8, 2018

(65) Prior Publication Data
US 2019/0061043 A1 Feb. 28, 2019

(30) Foreign Application Priority Data
Aug. 29, 2016 (JP) ................................. 2016-166598

(51) Int. Cl.
*B23K 11/11* (2006.01)
*B23K 11/24* (2006.01)
(Continued)

(52) U.S. Cl.
CPC .......... *B23K 11/257* (2013.01); *B23K 11/004* (2013.01); *B23K 11/02* (2013.01);
(Continued)

(58) Field of Classification Search
CPC ..... B23K 11/06–11/068; B23K 11/115; B23K 11/24; B23K 11/36–11/364
See application file for complete search history.

(56) References Cited

U.S. PATENT DOCUMENTS 1,354,293 A * 9/1920 Gravell ................ B23K 11/115
219/158
2,262,705 A * 11/1941 Tuttle .................... B23K 11/16
148/524
(Continued)

FOREIGN PATENT DOCUMENTS

CN 1691999 A 11/2005
CN 102500901 A 6/2012
(Continued)

OTHER PUBLICATIONS

International Search Report for PCT/JP2017/029136, dated Sep. 5, 2017.
(Continued)

*Primary Examiner* — Michael A Laflame, Jr.
(74) *Attorney, Agent, or Firm* — Squire Patton Boggs (US) LLP

(57) ABSTRACT

A method for manufacturing a joined member and a joined member manufacturing apparatus which can manufacture a joined member with a joint portion having an appropriate hardness. A method for manufacturing a joined member C by joining a first member D formed of a metal material having a possibility of undergoing quenching and a second member E formed of a metal material, the method includes a contact-placing step S1 of placing the first and second members D and E with joint target portions of the first and second members D and E respectively being in contact with each other; a joining step S2 of joining the first and second members D and E by passing a pulsed welding electric current A1 for joining through the joint target portions J of
(Continued)

the first and second members D and E; a first tempering step S3 of tempering a joint portion F, where the first and second members D and E are joined, by passing a first tempering electric current A2 through the joint portion F; and a second tempering step S4 of tempering the joint portion F by passing a second tempering electric current A3 smaller than the first tempering electric current A2 through the joint portion F.

7 Claims, 8 Drawing Sheets

(51) Int. Cl.
| | |
|---|---|
| *B23K 11/25* | (2006.01) |
| *B23K 11/00* | (2006.01) |
| *B23K 11/093* | (2006.01) |
| *B23K 11/16* | (2006.01) |
| *B23K 11/02* | (2006.01) |
| B23K 103/04 | (2006.01) |
| C21D 1/09 | (2006.01) |
| C21D 1/40 | (2006.01) |

(52) U.S. Cl.
CPC ............ *B23K 11/093* (2013.01); *B23K 11/16* (2013.01); *B23K 11/241* (2013.01); *B23K 2103/04* (2018.08); *C21D 1/09* (2013.01); *C21D 1/40* (2013.01); *C21D 2221/00* (2013.01)

(56) References Cited

U.S. PATENT DOCUMENTS 7,385,156 B2    6/2008    Nozue et al.

| | | | |
|---|---|---|---|
| 2014/0305912 A1* | 10/2014 | Taniguchi | B23K 11/24 219/91.22 |
| 2015/0217396 A1* | 8/2015 | Okada | B23K 11/115 403/271 |
| 2016/0082543 A1* | 3/2016 | Wakabayashi | B23K 11/115 219/86.31 |
| 2016/0221110 A1* | 8/2016 | Okada | B23K 11/3009 |
| 2016/0368080 A1* | 12/2016 | Hatta | B23K 11/24 |
| 2018/0104761 A1* | 4/2018 | Horino | B23K 11/115 |
| 2018/0311756 A1* | 11/2018 | Murayama | B23K 11/3009 |

FOREIGN PATENT DOCUMENTS

| | | |
|---|---|---|
| FR | 1036768 A | 9/1953 |
| JP | H5-305454 A | 11/1993 |
| JP | 2000-210776 A | 8/2000 |
| JP | 3648092 B2 | 5/2005 |
| JP | 2008-080363 A1 | 4/2008 |
| JP | 5909014 B1 | 4/2016 |
| JP | 2016-147305 A | 8/2016 |
| KR | 10-0722130 B1 | 5/2007 |
| KR | 10-2011-0059655 A | 6/2011 |
| WO | WO 2008/058675 A1 | 5/2008 |
| WO | WO 2015/005134 A1 | 1/2015 |

OTHER PUBLICATIONS

Office Action dated Mar. 11, 2019, in Korean Patent Application No. 10-2018-7022115, 8 pages.

Extended European Search Report dated Apr. 8, 2019, in European Patent Application No. 17846107.5, 7 pages.

First Office Action dated Mar. 22, 2019, in Chinese Patent Application No. 201780011470.X, 16 pages.

* cited by examiner

A : ELECTRIC CURRENT WAVEFORM
T₁: TEMPERATURE OF CENTER OF JOINT PORTION
T₂: TEMPERATURE OF END PORTIONS

METHOD FOR MANUFACTURING JOINED MEMBER AND JOINED MEMBER MANUFACTURING APPARATUS

TECHNICAL FIELD

The present invention relates to a method for manufacturing a joined member and a joined member manufacturing apparatus, and specifically, to a method for manufacturing a joined member and a joined member manufacturing apparatus according to which a joined member with a welded portion having an appropriate hardness can be obtained.

BACKGROUND ART

In the process of joining carburized materials in particular, there are cases where a carburized layer is quenched by heat produced at the time of joining such that the structure thereof becomes extremely hard and brittle. In such cases, it has been possible to perform tempering through discharging twice by a capacitor-type resistance welding machine. (for example, Japanese Patent No. 3648092)

PRIOR ART DOCUMENT

Patent Document

Patent Document 1: Japanese Patent No. 3648092

SUMMARY OF THE INVENTION

Problem to be Solved by the Invention

When tempering is performed through discharging twice by a capacitor-type resistance welding machine, a large electric current is required at the time of the tempering in order to make the central portion of a joint portion have the required hardness; hence, there is a possibility that a portion where an electric current tends to concentrate ends up being quenched again.

The present invention has been made in view of the above problem, and it is therefore an object of the present invention to provide a method for manufacturing a joined member and a joined member manufacturing apparatus according to which, even in a case where a joint portion is quenched when two members are joined, the manufactured joined member can be made such that the joint portion thereof has an appropriate hardness.

Means for Solving the Problem

In order to achieve the above object, a method for manufacturing a joined member according to the first aspect of the present invention is, as illustrated with reference to FIGS. 3A, 3B, 3C, 4, 5A, 5B, 8A, and 8B for example, a method for manufacturing a joined member C by joining a first member D formed of a metal material having a possibility of undergoing quenching and a second member E formed of a metal material, and the method includes a contact-placing step S1 of placing the first member D and the second member E with a joint target portion of the first member D and a joint target portion of the second member E being in contact with each other; a joining step S2 of joining the first member D and the second member E by passing a pulsed welding electric current A1 for joining through the joint target portions J of the first member D and the second member E; a first tempering step S3 of tempering a joint portion F by passing a first tempering electric current A2 through the joint portion F, the joint portion F being a portion where the first member D and the second member E are joined; and a second tempering step S4 of tempering the joint portion F by passing a second tempering electric current A3 smaller than the first tempering electric current A2 through the joint portion F. Here, the tempering electric current is typically a pulsed welding electric current, similarly to the joining electric current for joining.

With this configuration, in a case where the joint portion is quenched in the joining step, tempering can be performed over the entirety of the joint portion in the first tempering step and the second tempering step, and hence, a joined member with a joint portion having an appropriate hardness can be manufactured.

As for the method for manufacturing a joined member according to the second aspect of the present invention, as shown in FIGS. 5A and 5B, for example, the joining step S2 includes a resistance welding step of passing a pulsed welding electric current through the joint target portions of the first member D and the second member E while pressurizing P the joint target portions.

With this configuration, since pressure is applied, occurrence of plastic flow is facilitated, and the members can be joined with certainty. In addition, maintenance of pressure enables suppression of occurrence of cracks.

As for the method for manufacturing a joined member according to the third aspect of the present invention, in the method for manufacturing a joined member according to the first or second aspect, the pulsed welding electric current is less than the first tempering electric current.

With this configuration, the joint portion having been quenched in the joining step can be tempered.

As for the method for manufacturing a joined member according to the fourth aspect of the present invention, as shown in FIGS. 6, 8A and 8B, for example, in the method for manufacturing a joined member according to any one of the first aspect to the third aspect, the joint portion has a direction of length and a direction of width w shorter than the length, and a central portion F1 in the width direction w is tempered in the first tempering step S3, whereas both end portions F2 and F3 sandwiching the central portion F1 are tempered in the second tempering step S4.

With this configuration, the end portions in the width direction can have an appropriate hardness.

As for the method for manufacturing a joined member according to the fifth aspect of the present invention, in the method for manufacturing a joined member according to any one of the first aspect to the fourth aspect, the method further includes a third tempering step of tempering the joint portion F by passing a third tempering electric current smaller than the second tempering electric current A3 through the joint portion F.

With this configuration, since tempering is performed by passing the third tempering electric current that is smaller than the second tempering electric current, a joined member in which there is little variation in hardness over the entire joint portion can be manufactured. Note that tempering may also be performed four or more times while gradually decreasing the electric current value. By performing tempering by repeating discharge over a plurality of times, variation in hardness between the end portions and the central portion of the joint portion can be reduced, thereby achieving an even more uniform hardness.

In order to achieve the above object, a joined member manufacturing apparatus according to the sixth aspect of the present invention is, as illustrated with reference to FIG. 1 for example, a apparatus for manufacturing a joined member C (FIG. 3C) by joining a first member D formed of a metal material having a possibility of undergoing quenching and a second member E formed of a metal material, and the joined member manufacturing apparatus includes a first electrode 11 to be brought into contact with the first member D; a second electrode 12 to be brought into contact with the second member E; a pressing device configured to press P (to apply pressure) (FIGS. 5A and 5B) joint target portions of the first member D and the second member E; a power source 15 configured to carry out heating on, by passing a pulsed welding electric current through, a portion at which the joint target portion of the first member D in contact with the first electrode 11 and the joint target portion of the second member E in contact with the second electrode 12 contact each other; and a controller 50 configured to control the power source 15 to allow a first tempering electric current A2 and a second tempering electric current A3 smaller than the first tempering electric current A2 to pass through a joint portion between the first member D and the second member E joined by the heating, the second tempering electric current A3 passing when a predetermined time period t1 has elapsed after passage of the first tempering electric current.

With this configuration, it is possible to have the controller control the magnitude of the tempering electric current at the joint portion where the members have been joined through heating, enabling manufacture of a joined member with a joint portion having an appropriate hardness.

In order to achieve the above object, a method for manufacturing a joined member according to the seventh aspect of the present invention is, as illustrated with reference to FIGS. 1, 4, 8A and 8B for example, a method for manufacturing a joined member using the joined member manufacturing apparatus according to the fifth aspect, and the method includes a member placing step S1 of placing the first member D and the second member E in the joined member manufacturing apparatus 1; a joining step S2 of joining the first member and the second member by passing a pulsed welding electric current A1 between the first electrode 11 and the second electrode 12; a first tempering step S3 of tempering a joint portion F by passing a first tempering electric current A2 between the first electrode 11 and the second electrode 12, the joint portion F being a portion where the first member and the second member are joined in the joining step S2; and a second tempering step S4 of tempering the joint portion F by passing a second tempering electric current A3 smaller than the first tempering electric current A2 between the first electrode 11 and the second electrode 12.

With this configuration, in a case where the joint portion is quenched in the joining step, tempering can be performed over the entirety of the joint portion in the first tempering step and the second tempering step, and hence, a joined member with a joint portion having an appropriate hardness can be manufactured.

Effect of the Invention

According to the present invention, even in a case where a joint portion is quenched when two members are joined together, a joined member with a joint portion having an appropriate hardness can be obtained.

DESCRIPTION OF EMBODIMENTS

Figure 1:
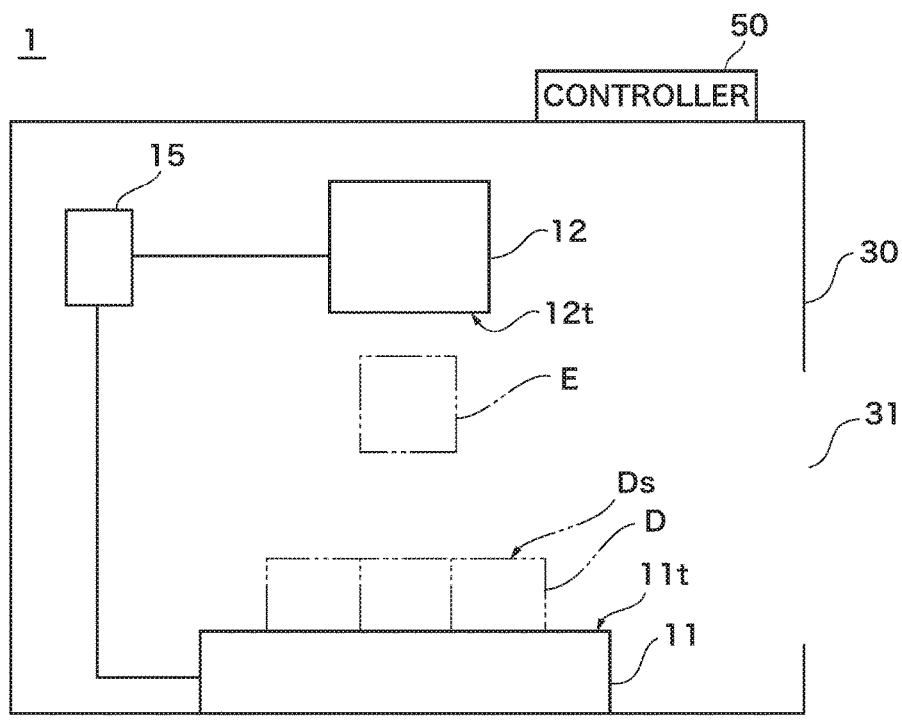
FIG. 1 is a general configuration diagram of a joined member manufacturing apparatus according to an embodiment of the present invention.

This application is based on the Patent Application No. 2016-166598 filed on Aug. 29, 2016 in Japan, the contents of which are hereby incorporated in its entirety by reference into the present application, as part thereof. The present invention will become more fully understood from the detailed description given hereinbelow. Further range of application of the present invention will become clearer from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the changes and modifications, those which may not literally fall within the scope of the patent claims constitute, therefore, a part of the present invention in the sense of doctrine of equivalents.

Description will hereinafter be made of an embodiment of the present invention with reference to the drawings. The same or corresponding members are denoted with the same reference numerals in all the drawings, and their descriptions are not repeated.

"Joining" as referred to in the present invention is typically solid phase joining. Solid phase joining is a technical term used in the field of welding and is a generic term for welding methods in which solid phase surfaces are joined as joint surfaces. In this method, welding on a joint portion (welded joint) is performed at a temperature equal to or below the melting point of a base material without using a melting material, such as a brazing material, which serves to join the solid phase surfaces. In this way, notwithstanding the term "welding", members to be joined are joined without being melted. Alternatively, even when partial melting occurs, joining strength is obtained at a portion that has been joined at or below the melting point. For the sake of convenience, when the concept "solid phase joining" is referred to in the present specification, the concept encompasses cases where such partial melting occurs, in particular, cases where an edge portion in Ring mash joining explained below is melted partially or a tip end portion of a projection in projection joining explained below is melted partially. Such partial melting typically occurs only at a timing immediately following start of energization.

Ring mash (registered trademark) joining is one known method for electrically joining two members to be joined with large joining strength. In this method, an outer diameter of a portion to be joined of the one member to be joined is made somewhat larger than an inner diameter of a portion to be joined of a hole portion of the other member to be joined, thereby creating an overlap margin. Positioning is carried out such that a portion to be joined of the one member to be joined slightly overlaps with the portion to be joined of the hole portion of the other member to be joined, and in this state, the two members to be joined are energized while being pressed. In this manner, the solid phase joining is carried out by causing plastic flow in the portions to be joined and pressing one member to be joined into the hole portion of the other member to be joined. Another similar joining method is projection joining. Specific description on the Ring mash joining and projection joining will be given later.

First, with reference to FIG. 1, a joined member manufacturing apparatus 1 according to an embodiment of the present invention will be explained. FIG. 1 is a general configuration diagram of the joined member manufacturing apparatus 1. The joined member manufacturing apparatus 1 includes: an electrode 11 serving as a first electrode to be brought into contact with a member D serving as a first member; an electrode 12 serving as second electrode to be brought into contact with a member E serving as a second member; a welding power source 15; a housing 30 accommodating these; and a controller 50. Now, before giving detailed explanation on the joined member manufacturing apparatus 1, a configuration of a joined member that is manufactured by the joined member manufacturing apparatus 1 will be illustrated by way of example.

The joined member manufacturing apparatus 1 is configured to be able to carry out resistance welding on the members D and E using the electrodes 11 and 12. The electrode 11 has a first contact face 11t that is formed on an upper face of the electrode 11 and that the member D is brought into contact with. The first contact face 11t is typically formed to be flat. The electrode 11 is typically placed on a bottom face of the housing 30 such that the first contact face 11t is horizontal. The electrode 12 is placed above the electrode 11 and has a second contact face 12t that is formed on a lower face of the electrode 12 and that the member E is brought into contact with. The second contact face 12t is typically formed to be flat. The electrode 12 is supported by an electrode support (not illustrated) such that the second contact face 12t is horizontal. The electrode 12 supported by the electrode support (not illustrated) is configured to be movable up and down and to be able to be pressed against the electrode 11. The electrodes 11 and 12 are electrically connected to the welding power source 15.

The welding power source 15 is a device for supplying the electrodes 11 and 12 with an electric current. In this embodiment, the welding power source 15 is connected to an AC power source such as a commercial AC power source or AC power generator, and has a power source unit for boosting and rectifying the AC electric power received from the AC power source, a capacitor for storing and discharging electrical energy, a welding transformer for converting the electric current supplied from the power source unit and the capacitor into a large electric current, and a switch component disposed upstream of the welding transformer. The welding power source 15 is configured to be able to discharge the energy charged in the capacitor instantaneously. Thus, in a welding process using the welding power source 15, a large electric current can be obtained within a short period of time and welding can be achieved with less impact from heat. In addition, in the welding power source 15, an input power source (AC power source) with a relatively small capacity suffices. The welding power source 15 is configured to be able to set, as appropriate, the magnitude of the electric current supplied to the first electrode 11 and the second electrode 12. The welding power source 15 will be described specifically later.

The housing 30 accommodates devices and machines, such as the electrode 11, electrode 12, and welding power source 15, which constitute the joined member manufacturing apparatus 1. The joined member manufacturing apparatus 1, which is constituted in this way, can be easily transported as one unit. The housing 30 has an opening 31 through which the members D and E and the joined member C can be put into and taken out of the housing 30.

The controller 50 is a device for controlling operation of the joined member manufacturing apparatus 1. The controller 50 is connected with each of the electrode support (not illustrated) and a coil support (not illustrated) via a separate signal cable and is configured to be able to move the electrode 12 up and down. The controller 50 is also connected to the welding power source 15 via a signal cable and is configured to be able to control supply and shutoff of an electric current to the electrodes 11 and 12 and the magnitude of the electric current supplied thereto. The controller 50 is typically attached to the housing 30 either inside or outside the housing 30 but may also be disposed at a location remote from the housing 30 and configured to operate the joined member manufacturing apparatus 1 remotely.

Figure 2A:
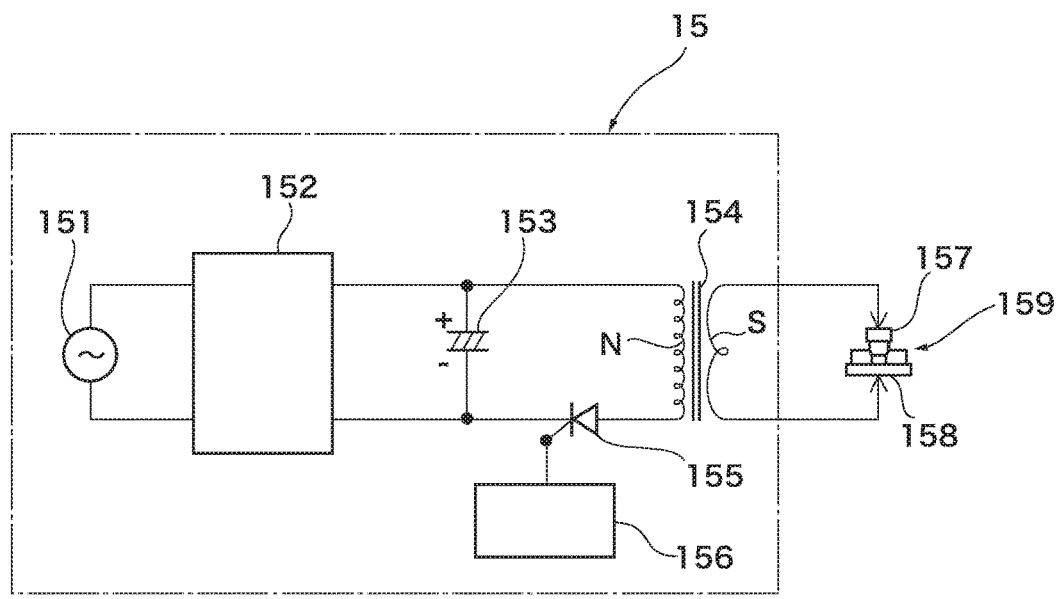
FIG. 2A is a circuit diagram of a power source in a power source device for realizing a method for manufacturing a joined member according to an embodiment of the present invention.

Next, with reference to FIGS. 2A and 2B, an exemplary circuit for realizing the aforementioned welding method will be described. In FIG. 2A, reference numeral 151 denotes a commercial AC power source, 152 denotes a charging circuit constituted by, for example, a combination of a diode bridge rectifier and a control switch such as thyristor or a bridge rectifier including a control switch such as an IGBT, 153 denotes a capacitor formed through serial-parallel connection of a plurality of electrolytic capacitors, 154 denotes an ordinary welding transformer including primary winding N and secondary winding S, 155 denotes a switch, such as a thyristor, IGBT, or transistor, which is connected in series with the primary winding N of the welding transformer 154, 156 denotes a drive circuit of the switch 155, 157 and 158 each denotes a welding electrode, and 159 denotes two objects to be welded.

Next, welding operation will be explained. First, the charging circuit 152 rectifies and converts commercial power into DC power and charges the capacitor 153 up to a first setting voltage. The first setting voltage is, for example, 400 V. When a charged voltage of the capacitor 153 reaches the first setting voltage, the switch 155 is turned on by a drive signal from the drive circuit 156 so that charged electrical charge of the capacitor 153 is discharged and a pulsed electric current flows through the primary winding N of the transformer 154. Accordingly, a pulsed welding electric current I flows from the secondary winding S of the transformer 154 to the objects 159 to be welded that are pressed and held between the welding electrodes 157 and 158, and resistance welding is thus carried out.

Next, when the switch 155 is turned off and the capacitor 153 is charged by the charging circuit 152 up to a second setting voltage, e.g. 420 V, the switch 155 is again turned on by a drive signal from the drive circuit 156 so that charged electrical charge of the capacitor 153 is discharged and a pulsed electric current flows through the primary winding N of the transformer 154. In the secondary side of this pulsed electric current, a pulsed post-heating electric current i having a larger peak value than the pulsed welding electric current I flows, whereby tempering is carried out on the objects 159 to be welded that have been welded as described above. By controlling a value of charged voltage of the capacitor 153, a peak value of the pulsed electric current can be adjusted. Here, the pulsed post-heating electric current i has larger electrical energy than the pulsed welding electric current I, and an electric current waveform of the former is similar to that of the latter.

Figure 2B:
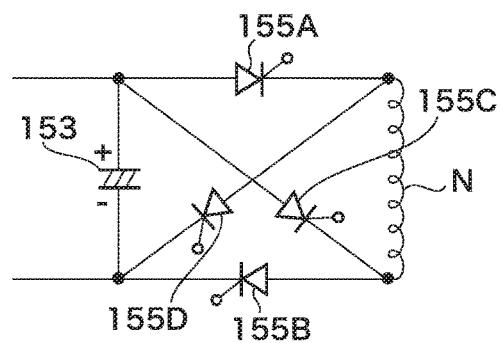
FIG. 2B is a circuit diagram of a switch in the circuit of the power source in the power source device for realizing the method for manufacturing a joined member according to the embodiment of the present invention.

In the circuit in FIG. 2A, the pulsed welding electric current I and pulsed post-heating electric current i are passed through the primary winding N of the transformer 154 in homopolarity; however, in order to mitigate bias magnetization where a magnetic core of the transformer is strongly excited in one direction, there may be provided a switching circuit that is similar to a polarity inversion circuit and is constituted by switches 155A to 155D, as illustrated in FIG. 2B, and by turning on the switches 155A and 155B and switches 155C and 155D as pairs, a pulsed electric current can be passed through the primary winding N of the transformer 154 in alternate directions. Further, by employing a sequence in which the switches 155A and 155B and switches 155C and 155D are turned on alternately in two-times alternation, bias magnetization of the transformer can be eliminated, and also, there will be no need to provide a reset circuit that reduces a magnetic flux of the magnetic core of the transformer in every cycle to almost zero or to a fixed value.

The pulsed electric current here is typically a single pulsed electric current. This pulsed electric current has an electric current peak value of, for example, several tens to several hundreds of thousands of amperes and a pulse width thereof is from ten milliseconds to 100 milliseconds. With such a pulsed electric current, joining between members to be joined can be carried out with certainty. A pulsed electric current requires less time compared to, for example, an electromagnetically induced electric current. Besides, with the electromagnetically induced electric current, energization is carried out from the surface of a material, whereas with the pulsed electric current, the inside of a material can be energized directly, enabling local heating. That is to say, the probability of unplanned heating of an unintended portion is low.

Figure 3A:
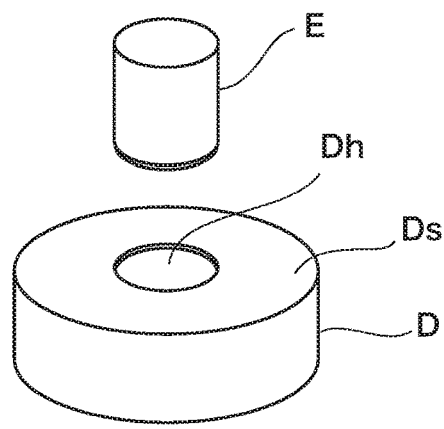
FIG. 3A is a perspective view of a member D and a member E in an embodiment of the present invention.
Figure 3B:
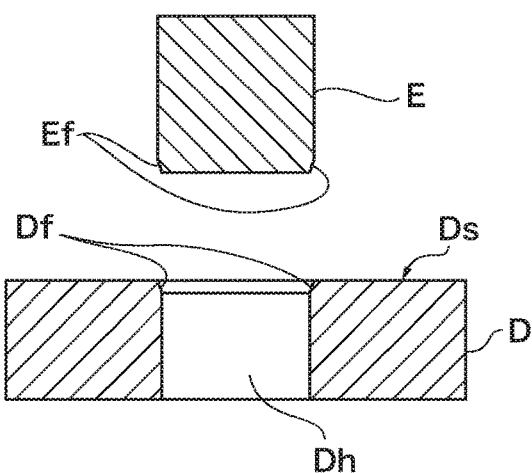
FIG. 3B is a cross-sectional view of the member D and member E in the embodiment of the present invention.
Figure 3C:
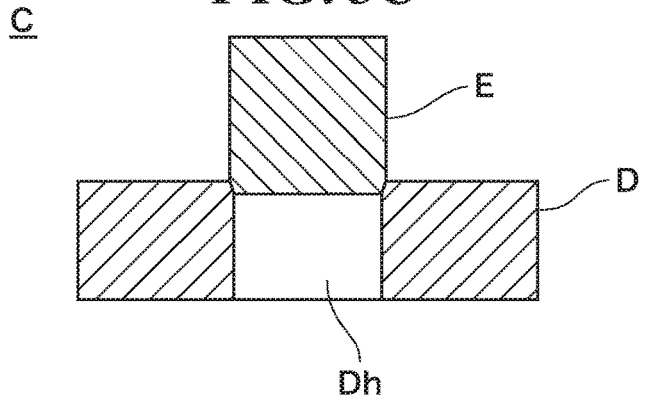
FIG. 3C is a cross-sectional view of a joined member C in the embodiment of the present invention.

FIG. 3A is a perspective view of the member D serving as the first member and the member E serving as the second member. FIG. 3B is a cross-sectional view of the members D and E. FIG. 3C is a cross-sectional view of the joined member C. The joined member C is a component obtained by welding the members D and E together. In this embodiment, description is given on the assumption that the member D is formed to have a ring-like shape and the member E is formed to have a circular cylindrical shape. The member D has a thick disk-like shape, through the center of which a circular cylindrical hollow portion Dh is formed. In the member D, an outer circumference of the disk and a circumference of the hollow portion Dh are concentric with each other. In the member D, a corner between an end face Ds and the hollow portion Dh is chamfered so as to form a first joint surface Df. The first joint surface Df corresponds to a joint target portion of the member D. In this embodiment, the member D is made of carburized steel obtained by subjecting a ring-shaped low-carbon steel blank to surface carburization. Thus, the member D is a member that has a soft and tough internal structure and also has hard surfaces that have a possibility of undergoing quenching when heated. Here, the expression "having a possibility of undergoing quenching" means that the surfaces contain carbon to such an extent as to be quenched when predetermined conditions are satisfied. Typically, the surfaces are quenched when heated during welding, but may have already been quenched by heating prior to welding (in a carburized steel manufacturing factory, for example). The predetermined conditions differ depending on the specification of a welding machine, the type of material used as the member D, etc.

The member E is formed such that an outer diameter thereof is somewhat larger than a diameter of the hollow portion Dh of the member D. In the member E, a corner between an end face and a lateral face of the member E is chamfered so as to form a second joint surface Ef. The second joint surface Ef corresponds to a joint target portion of the member E. The second joint surface Ef is formed such that the second joint surface Ef contacts the first joint surface Df of the member D by surface contact. In this embodiment, the member E is made of cast iron. In this embodiment, the joined member C is formed by joining the first joint surface Df and the second joint surface Ef by solid phase joining. Solid phase joining, as has been described earlier, is welding that is performed at a temperature equal to or lower than a melting point. In this embodiment, the solid phase joining is achieved by resistance welding. In this embodiment, the ring-shaped first joint surface Df and the second joint surface Ef are joined almost uniformly along their entire circumferences. Examples of characteristics of such joining involving a ring member are as follows: positioning is easy and jigs are simple; the shapes of joint surfaces are simple and processing cost is low; joining can be completed within a short period of time and cycle time is short; and thermal distortion is less likely to occur and dimensional accuracy after joining can be easily achieved. The joined member C can be utilized as a component in a large drive system, such as a gear or shaft.

Figure 4:
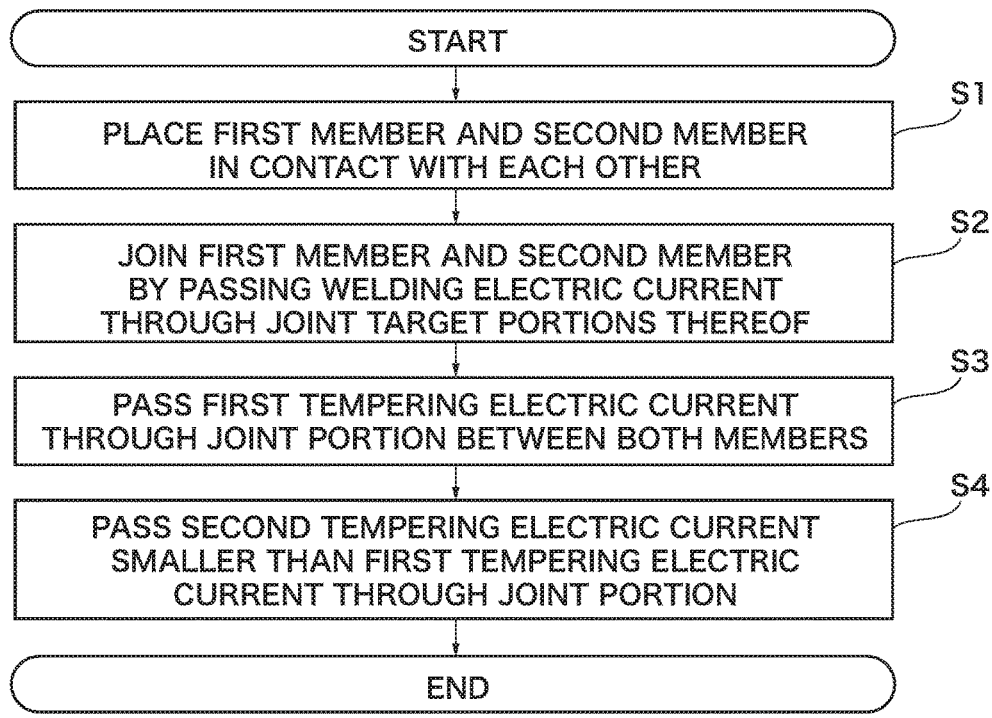
FIG. 4 is a flowchart illustrating a procedure of the method for manufacturing a joined member according to an embodiment of the present invention.

Next, with reference to FIG. 4, the method for manufacturing a joined member according to an embodiment of the present invention will be briefly explained first. For symbols, reference is to be made to FIGS. 1, 3A, 3B and 3C as appropriate. The method for manufacturing the joined member C explained here is understood as being performed using the joined member manufacturing apparatus 1 that has been explained so far. In other words, the explanation given below also serves as an explanation of function of the joined member manufacturing apparatus 1. Note, however, that the joined member C may also be manufactured by a method other than causing the joined member manufacturing apparatus 1 to operate.

The method explained here is a method for manufacturing the joined member C that is obtained by joining together: the member D that is formed of, for example, a metal material having a possibility of undergoing quenching and that serves as the first member; and the member E that serves as the second member. First, in the contact-placing step, the first member and the second member are placed with the joint target portion of the member D and the joint target portion of the member E being in contact with each other (step S1). A joining electric current for joining is passed through the joint target portions of the members D and E having been brought into contact and placed, thereby joining the two members; this is the joining step (step S2). After the lapse of a first predetermined time period, a first tempering electric current is passed through the joint portion between the members D and E having been joined; this is the first tempering step (step S3). Then, when a second predetermined time period has passed, a second tempering electric current, which is smaller than the first tempering electric current, is passed through the joint portion; this is the second tempering step (S4). In the current case, the member formed of a metal material having a possibility of undergoing quenching is the member D; however, the member formed of a metal material having a possibility of undergoing quenching may be the member E, or both members D and E may be formed of a metal material having the possibility of undergoing quenching.

Preferably, in the joining step, the joining electric current is passed through the joint target portions of the members D and E while the joint target portions are being pressed. Pressing facilitates occurrence of plastic flow. The joining step is typically resistance welding in which Joule heat, which is generated by contact resistance between the members D and E made of metal materials, is used to join the two members. The resistance welding here, despite being called "welding", is typically solid phase joining that does not involve melting, as has been described earlier.

Lowering of the member E in bringing same into contact with the member D in the contact-placing step, control of a magnitude of the electric current at each of the joining step and the two tempering steps, adjustment of the predetermined time period, and control of the pressing are performed by the controller 50.

A specific example of a relative magnitude relationship among the joining electric current, the first tempering electric current, and the second tempering electric current will be described later.

Figure 5A:
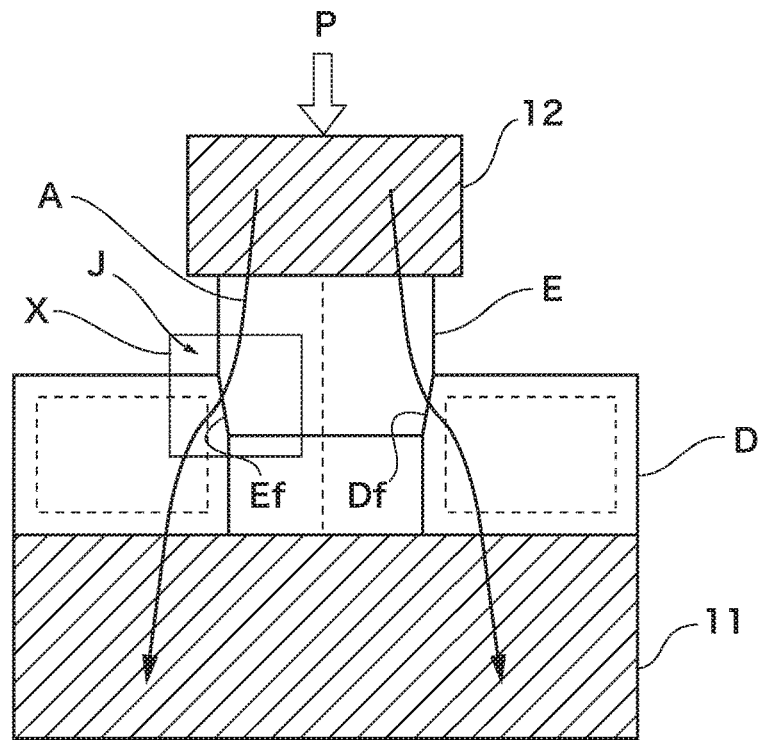
FIG. 5A is an overall diagram including two electrodes and two members for discharge in the case of Ring mash (trademark registered in Japan) joining.
Figure 5B:
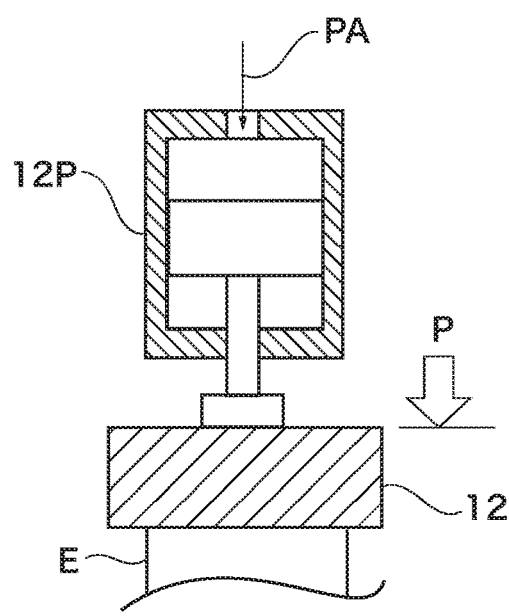
FIG. 5B is a partial cross-sectional view of a fluid pressure cylinder piston serving as a pressing device that presses a second electrode for discharge in the case of Ring mash (trademark registered in Japan) joining.
Figure 6:
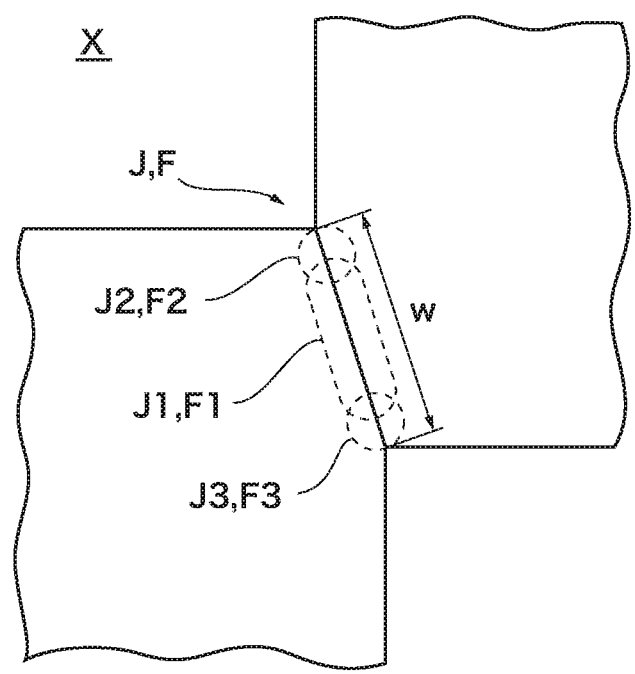
FIG. 6 is an enlarged diagram of a portion corresponding to a contact portion illustrated in FIG. 5. Here, illustrated is a welding-completed portion having already undergone joining.

With reference to FIGS. 5A, 5B and 6, explanation will be given on the flow of an electric current during joining and the joint portion in an embodiment of the present invention.

Each of FIGS. 5A and 5B is an explanatory diagram for discharge in the case of Ring mash (trademark registered in Japan) joining. While pressure P is being applied on the electrode 12 from a fluid pressure cylinder piston 12P serving as a pressing device, an electric current A is passed from the electrode 12 in contact with the member E toward the electrode 11 in contact with the member D. The fluid pressure cylinder piston 12P is supplied with a pressure fluid PA. The pressure fluid PA is typically air but may also be a liquid (oil or water). The electric current flows through a contact portion J of the two members and heats the contact portion J to achieve joining, thereby rendering the contact portion J into the joint portion. In this embodiment, as described above, the welding power source 15 includes a capacitor and discharges electrical energy instantaneously; therefore, a relatively large electric current is obtained within a short period of time (e.g., several tens of milliseconds) and the first joint surface Df and the second joint surface Ef are solid-phase joined (hereafter, the joint portion obtained upon completion of joining between the first joint surface Df and the second joint surface Ef will be referred to as "welding-completed portion F"). Here, in the case where the member formed of a metal material having the possibility of undergoing quenching is the member D, the first joint surface Df side of the welding-completed portion F is quenched due to heating at the time of welding. Undergoing quenching results in an increase in hardness (a Vickers hardness of about 800, for example) but also vulnerability to impacts, leading to possible occurrence of cracks. Note that a toggle mechanism may be used for the pressing device.

Conventionally, in order to eliminate occurrence of a possibility of a crack occurring due to quenching, the carburized layer having the possibility of undergoing quenching was removed only at and around a portion to be joined. However, since the carburized layer is extremely hard, removal of the carburized layer involved enormous time and effort. An alternative method for preventing quenching of a joint portion is anti-carburization treatment that prevents formation of a carburized layer during carburization, but anti-carburization treatment also involves a large number of processing steps. Thus, measures against formation of a carburized layer at a portion subject to joining involves enormous time and effort, and therefore, considering suppression of occurrence of a crack due to quenching upon carrying out welding in a state where a carburized layer is left formed in the portion subject to joining, it is conceivable to pass an electric current once more to temper the joint portion after carrying out the joining by welding. However, even when the joint portion is tempered by passing an electric current once more, the Vickers hardness may not decrease to a hardness required for the joined member C as a product. The inventors of the present invention have discovered that even in a case in which welding is carried out in a state where a carburized layer is left formed in a portion subject to joining so that the carburized layer undergoes quenching, by carrying out the process described below, the hardness of the joint portion can be lowered to a hardness required for the joined member C as a product or, at least, a quenched portion can be prevented from remaining in the joint portion. Hereinbelow, explanation will be given on the step that follows the welding in the method for manufacturing a joined member according to this embodiment.

FIG. 6 is an enlarged diagram of a portion X including the contact portion J illustrated in FIG. 5. Here, illustrated is the welding-completed portion F having already undergone joining. This embodiment is a case where Ring mash (trademark registered in Japan) joining is employed, and the member D is a member to be joined in which a circular hole is formed. The member E is a circular member to be joined that is pushed into the hole. Thus, the contact portion J, or the welding completed portion F, has a shape of a band that is annularly contiguous. Annular means there is no edge in a length direction. A width direction means a width direction of the band, and in this embodiment, the width means a width w of the welding-completed portion F, the magnitude thereof being normally 1 mm to 10 mm, typically 1.5 mm to 8 mm, and more typically 2 mm to 6 mm. It should be noted that in a different embodiment, a strip shape with a finite length in the length direction may be employed.

The welding-completed portion F may be divided into a central portion F1 thereof and both end portions F2 and F3 sandwiching the central portion F1. The hardness of the welding-completed portion F changes in the respective steps of the joining step S2, first tempering step S3, and second tempering step S4, as will be described below.

Figure 7:
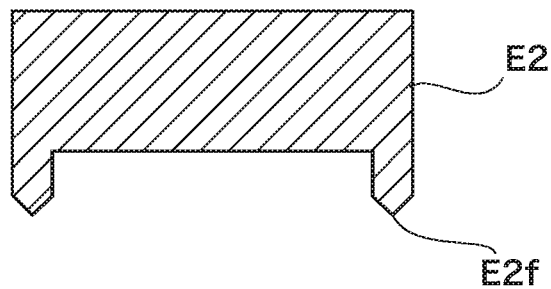
FIG. 7 is a cross-sectional view of a member in the case of ring projection joining.
Figure 7:

As illustrated in FIG. 7, projection joining may be employed instead. To a member D2 serving as the first member, a member E2 serving as the second member is joined. An annular projection E2f is formed on the member E2, and the projection E2f is joined to the member D2 by being pressed against the member D2 by pressure. In this case, while the welding-completed portion F is formed on a planar surface, the welding-completed portion F can be divided into a central portion F1 and both end portions F2 and F3 sandwiching the central portion F1, similarly to the case of Ring mash (trademark registered in Japan) joining.

With reference to the diagrams in FIGS. 8A and 8B, explanation will be given on the changes and behaviors of the joint portion in the joining step and tempering steps.

Figure 8A:
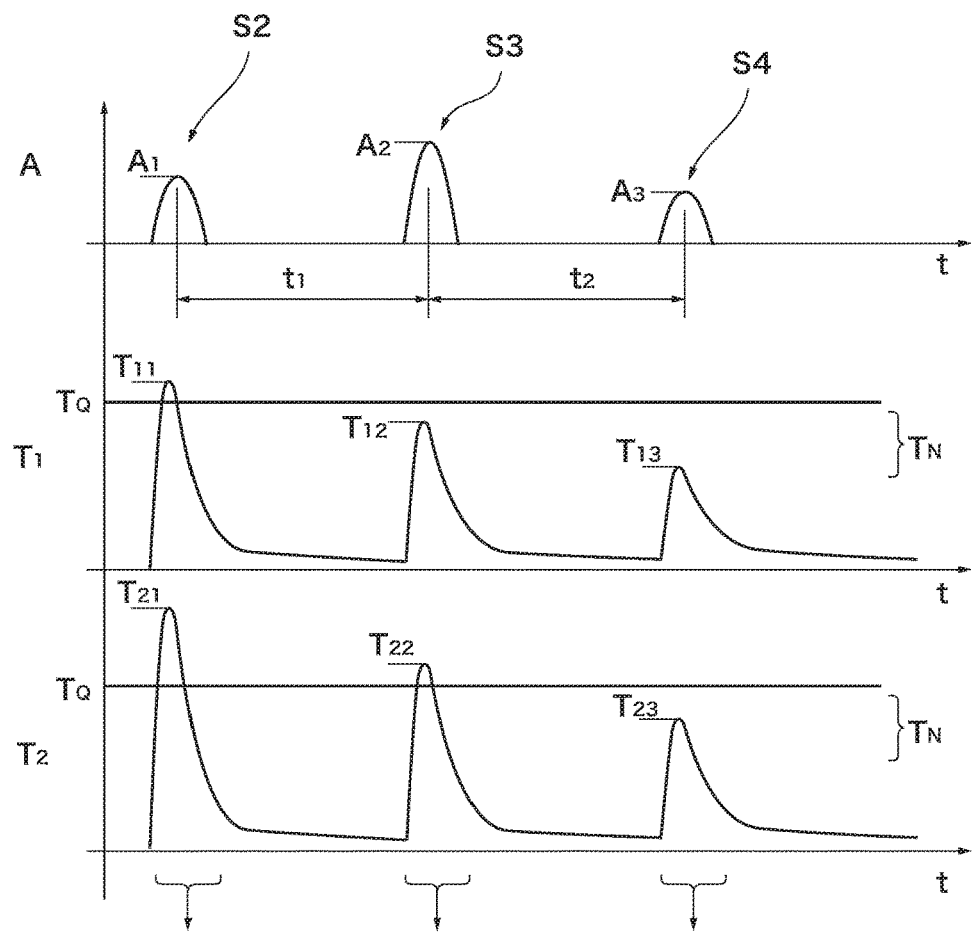
FIGS. 8A and 8B are diagrams explaining changes and behaviors of a joint portion in a joining step and a tempering step.
Figure 8B:
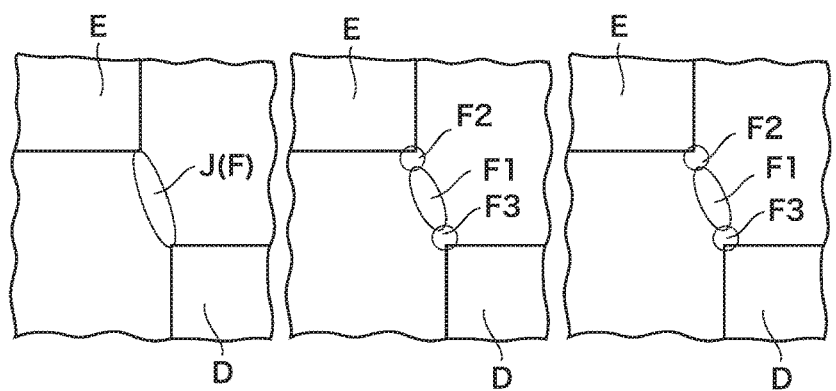

FIG. 8A is a diagram illustrating electric currents in the respective steps, a temperature of a central portion of a joint portion in the respective steps, and a temperature of end portions in the respective steps. FIG. 8B is a diagram illustrating correspondences in a contact portion and welding-completed portion in the respective steps.

First, in the joining step S2, an electric current value A1 is discharged to carry out joining on the contact portion J. The electric current value A1 is set to a value according to which the temperature of the central portion J1 of the contact portion J is T11 that is higher than a transformation temperature (a temperature at which the central portion J1 turns into austenite) (lower limit value of a quenching temperature) TQ. In the joining step S2, since electric current density is higher at both end portions J2 and J3 than at the central portion J1 so that heat generation resulting from Joule heat (Ri2) is greater and, moreover, heat stays due to reduced heat dissipation (heat conduction), the temperature of both end portions J2 and J3 are T21 that is higher than that of the central portion J1 (T11<T21). In this embodiment, the temperature T11 is not only higher than the temperature TQ, but also lower than a melting point of the members to be joined. Typically, the temperature T21 is also lower than the melting point.

In the joining step S2, the temperatures within the contact portion J as a whole (J1, J2, and J3) are higher than TQ; therefore, the entire contact portion J assumes a quenched state gradually as cooling progresses. This portion undergoes joining and becomes the welding-completed portion F (the central portion F1 and both end portions F2 and F3).

Next, the first tempering step S3 is carried out. An electric current value A2 at this time is set to a value according to which the temperature of the central portion F1 is T12 that is a tempering temperature (a temperature that is slightly lower than the transformation temperature TQ). The electric current A2 is passed when a predetermined time period t1 has passed after the electric current A1. The predetermined time period t1 is a period that suffices to allow the welding-completed portion F to cool down and entirely assume a quenched state, and in an embodiment, is 1 sec to 10 sec, preferably 1.5 sec to 8 sec, and more preferably 2 sec to 6 sec. When this period is shorter than 1 sec, cooling will be insufficient, and when too long, productivity will be degraded. The predetermined time period t1 is decided, as appropriate, in accordance with a material and shape of the members to be joined, the electric current value A1, etc. It is preferable that measurement be conducted in advance using a sample to decide an appropriate time interval and store same in the controller 50. Setting the time interval to an interval between respective time points at which the electric currents A1 and A2 are started to pass would be simple. However, the time interval may instead be an interval between respective peaks thereof.

In the first tempering step S3, similarly to the case of the joining step S2, a temperature T22 of both end portions F2 and F3 is higher compared to the temperature T12 of the central portion F1 (T12<T22). In some cases, the temperature T22 exceeds the temperature TQ. Accordingly, a state is brought about where the central portion F1 is tempered by cooling, while both end portions F2 and F3 are quenched again.

Next, the second tempering step S4 is carried out. An electric current value A3 at this time is set to a value according to which a temperature T23 of both end portions F2 and F3 is a tempering temperature (a temperature that is slightly lower than the transformation temperature TQ). The electric current A3 is passed when a predetermined time period t2 has passed after the electric current A2. The predetermined time period t2 is a period that suffices to allow the central portion F1 of the welding-completed portion F to cool down and assume a tempered state, and despite being shorter than the time period t1, the predetermined time period t2 may also be set to the same value as the time period t1 for the sake of convenience.

In the second tempering step S4, since a temperature T13 of the central portion F1 is lower compared to the temperature T23 of both end portions F2 and F3, the state of the central portion F1 having been tempered in the first tempering step S3 is maintained (T13<T23). As cooling progresses, the central portion F1 gradually assumes a sufficiently tempered state and both end portions F2 and F3 gradually assume a lightly tempered state.

In this way, the entire welding-completed portion F (the central portion F1 and both end portions F2 and F3) can be brought into a tempered state. In other words, a carburized-tempered structure (a structure obtained by normal carburized treatment) is obtained in which a hardness of the center (central portion) of the joint portion is sufficiently low and the end portions have a higher hardness than the center of the joint portion. With the joined member manufacturing apparatus 1 and method for manufacturing a joined member according to this embodiment, occurrence of a crack can be suppressed while a hardness of the welding-completed portion F is lowered to a hardness required for a joined member as a product.

Furthermore, there may be provided a third tempering step (not illustrated) in which tempering is carried out on the welding-completed portion F by passing therethrough a third tempering electric current that is lower than the second tempering electric current A3. Moreover, tempering may be carried out four or more times while gradually decreasing the electric current value. By doing so, it is possible to manufacture a joined member including a joint portion having a uniform hardness where variation in hardness throughout the entire joint portion is small.

The electric current values A1, A2, and A3 are measured in advance using a sample for each material to be joined and are stored in the controller 50 as setting values. The controller 50 controls the electric current values so that the electric current values are setting values suitable for the respective steps. In an example, favorable results were obtained by setting the electric current values to A1=247 kA, A2=298 kA, and A3=256 kA.

In an embodiment of the present invention, the first tempering step and second tempering step are carried out without using an induction heating device or the like, but simply using the same resistance welding machine as in the joining step and through a similar step by changing an electric current value. In this way, a joined member with a welded portion having an appropriate hardness can be obtained. As a result of the joined member manufacturing apparatus being provided with a controller that performs control such that electric current values of electric current passing through an electrode are changed appropriately, there can be obtained a simple apparatus with which a joined member with a welded portion having an appropriate hardness can be obtained.

In the explanations above, a case was assumed where the welding power source 15 is configured to be able to instantaneously discharge energy that has been charged in a capacitor, but there may be adopted a power source configuration that is other than a capacitor-type and that is used in a welding machine.

In the explanations above, a case was assumed where the member D is formed to have a ring-like shape and the member E is formed to have the shape of a solid circular cylinder, but the member E may be hollow rather than solid, or the shape(s) of the member D and/or the member E may be other than those described herein. Further, while the member D has been described as being made of carburized steel, the member D may be made of high-carbon steel that has a possibility of undergoing quenching through welding even without being subjected to carburization treatment. While the member D has been described as being quenched by welding, the joined member C may be manufactured using a material that has been quenched before being welded. The member D and the member E may be made of either different types of metals or the same type of metal.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

DESCRIPTION OF REFERENCE NUMERALS AND SYMBOLS 1 joined member manufacturing apparatus
11 first electrode
11$t$ first contact face
12$t$ second contact face
12 second electrode
12P pressing device
15 power source
30 housing
31 opening
50 controller
151 commercial AC power source
152 charging circuit
153 capacitor
154 transformer
155 switch
156 drive circuit
157, 158 electrodes
159 joint target members (objects to be welded)
A joining electric current
A1 joining electric current
A2 first tempering electric current
A3 second tempering electric current
C joined member
D first member
D2 first member for projection joining
Dh hollow portion
Ds end face of the member D
Df first joint surface
E second member
Ef second joint surface
E2 second member for projection joining
E3$f$ projection
F joint portion (welding-completed portion)
F1 central portion of the welding-completed portion
F2, F3 end portions of the welding-completed portion
J joint target portion (contact portion)
J1 central portion of the contact portion
J2, J3 end portions of the contact portion
Jf opposite edge-side region
Jn one edge-side region
P pressure
PA pressure fluid
Sf opposite edge
Sn one edge
S1 contact-placing step
S2 joining step
S3 first tempering step
S4 second tempering step
t1, t2 predetermined time periods
TQ transformation temperature (austenite turning temperature) (lower limit value of quenching temperature)
T11 temperature of the central portion of the contact portion in the joining step
T21 temperature of both end portions in the joining step
T22 temperature of the central portion in the first tempering step
T12 temperature of both end portions in the first tempering step
T13 temperature of the central portion in the second tempering step T23 temperature of both end portions in the second tempering step
w width of the welding-completed portion

The invention claimed is:

1. A method for manufacturing a joined member by joining a first member formed of a metal material having a possibility of undergoing quenching and a second member formed of a metal material, the method comprising:
   a contact-placing step of placing the first member and the second member with a joint target portion of the first member and a joint target portion of the second member being in contact with each other;
   a joining step of joining the first member and the second member by passing a pulsed welding electric current for joining through the joint target portions of the first member and the second member;
   a first tempering step of tempering a joint portion by passing a first tempering electric current through the joint portion, the joint portion being a portion where the first member and the second member are joined; and
   a second tempering step of tempering the joint portion by passing a second tempering electric current smaller than the first tempering electric current through the joint portion.

2. The method for manufacturing a joined member according to claim 1, wherein the joining step comprises a resistance welding step of passing a pulsed welding electric current through the joint target portions of the first member and the second member while pressurizing the joint target portions.

3. The method for manufacturing a joined member according to claim 1, wherein the pulsed welding electric current is less than the first tempering electric current.

4. The method for manufacturing a joined member according to claim 1, wherein
   the joint portion has a direction of length and a direction of width shorter than the length, and
   a central portion in the width direction is tempered in the first tempering step, whereas both end portions sandwiching the central portion are tempered in the second tempering step.

5. The method for manufacturing a joined member according to claim 1, the method further comprising:
   a third tempering step of tempering the joint portion by passing a third tempering electric current smaller than the second tempering electric current through the joint portion.

6. A joined member manufacturing apparatus for manufacturing a joined member by joining a first member formed of a metal material having a possibility of undergoing quenching and a second member formed of a metal material, the joined member manufacturing apparatus comprising:
   a first electrode to be brought into contact with the first member;
   a second electrode to be brought into contact with the second member;
   a pressing device configured to press joint target portions of the first member and the second member;
   a power source configured to carry out heating on, by passing a pulsed welding electric current through, a portion at which the joint target portion of the first member in contact with the first electrode and the joint target portion of the second member in contact with the second electrode contact each other; and
   a controller configured to control the power source to allow a first tempering electric current and a second tempering electric current smaller than the first tempering electric current to pass through a joint portion between the first member and the second member joined by the heating, the second tempering electric current passing when a predetermined time period has elapsed after passage of the first tempering electric current.

7. A method for manufacturing a joined member using the joined member manufacturing apparatus according to claim 6, the method comprising
   a member placing step of placing the first member and the second member in the joined member manufacturing apparatus;
   a joining step of joining the first member and the second member by passing a pulsed welding electric current between the first electrode and the second electrode;
   a first tempering step of tempering a joint portion by passing a first tempering electric current between the first electrode and the second electrode, the joint portion being a portion where the first member and the second member are joined in the joining step; and
   a second tempering step of tempering the joint portion by passing a second tempering electric current smaller than the first tempering electric current between the first electrode and the second electrode.

* * * * *